United States Patent
Fujita

(10) Patent No.: US 9,413,917 B2
(45) Date of Patent: Aug. 9, 2016

(54) POWER SOURCE DEVICE, IMAGE PROCESSING APPARATUS

(71) Applicant: KYOCERA Document Solutions Inc., Osaka-shi, Osaka (JP)

(72) Inventor: Hiroyuki Fujita, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/829,535

(22) Filed: Aug. 18, 2015

(65) Prior Publication Data

US 2016/0057303 A1 Feb. 25, 2016

(30) Foreign Application Priority Data

Aug. 22, 2014 (JP) ................................. 2014-169049

(51) Int. Cl.
*G06K 15/00* (2006.01)
*H04N 1/00* (2006.01)
*G06F 3/12* (2006.01)

(52) U.S. Cl.
CPC ....... *H04N 1/00899* (2013.01); *H04N 1/00901* (2013.01); *H04N 2201/0094* (2013.01)

(58) Field of Classification Search
None
See application file for complete search history.

(56) References Cited

U.S. PATENT DOCUMENTS

| 2007/0211096 | A1* | 9/2007 | Narushima | ................ B41J 2/01 347/14 |
| 2009/0003869 | A1* | 1/2009 | Takahashi | .......... G03G 15/5004 399/75 |
| 2011/0018347 | A1* | 1/2011 | Noda | .................... H02M 3/155 307/43 |
| 2011/0299868 | A1* | 12/2011 | Ito | ...................... G03G 15/2039 399/69 |
| 2014/0204409 | A1* | 7/2014 | Yamada | ............. H04N 1/00891 358/1.14 |

FOREIGN PATENT DOCUMENTS

JP 2013160866 A 8/2013

* cited by examiner

*Primary Examiner* — Dov Popovici
(74) *Attorney, Agent, or Firm* — Alleman Hall McCoy Russell & Tuttle LLP

(57) ABSTRACT

A main power source portion generates a primary DC power from an input AC power, and a first sub power source portion generates a power source control secondary DC power from the primary DC power. Each of a plurality of second sub power source portions, upon input of an activation signal, generates an equipment secondary DC power from the primary DC power. A sub-power-source control portion starts to operate upon receiving the power source control secondary DC power. The sub-power-source control portion outputs the activation signal to a display-related second sub power source portion with higher priority when the detection result of a power state detection portion satisfies a predetermined unfavorable condition, than when the detection result does not satisfy the unfavorable condition, and outputs an alarm signal to cause display-related equipment to output an alarm.

6 Claims, 4 Drawing Sheets

POWER SOURCE DEVICE, IMAGE PROCESSING APPARATUS

INCORPORATION BY REFERENCE

This application is based upon and claims the benefit of priority from the corresponding Japanese Patent Application No. 2014-169049 filed on Aug. 22, 2014, the entire contents of which are incorporated herein by reference.

BACKGROUND

The present disclosure relates to a power source device and an image processing apparatus that includes the power source device.

In general, an image processing apparatus such as a printer or a scanner includes a power source device that inputs an AC power from an AC power source such as a commercial power source, and generates a DC power from the AC power. There is a case where the image processing apparatus is not activated normally when the AC power is in an unfavorable state, namely, for example, when the frequency of the AC power is unstable or when the voltage of the AC power is insufficient.

In addition, there is known an image processing apparatus in which, when the input AC power is unstable, the process of recording images by the image forming portion is restricted.

SUMMARY

A power source device according to an aspect of the present disclosure includes a main power source portion, a first sub power source portion, a plurality of second sub power source portions, a power state detection portion, and a sub-power-source control portion. The main power source portion is a power source portion configured to generate a primary DC power from an input AC power and output the primary DC power. The first sub power source portion is a power source portion configured to generate, from the primary DC power, a power source control secondary DC power and output the power source control secondary DC power. The plurality of second sub power source portions are power source portions which are each configured to, upon input of an activation signal, generate an equipment secondary DC power from the primary DC power and output the equipment secondary DC power. The power state detection portion is a portion configured to detect a state of a power of the main power source portion. The sub-power-source control portion is a portion configured to start to operate upon receiving the power source control secondary DC power. The plurality of second sub power source portions include a display-related second sub power source portion configured to supply power to display-related equipment that displays information. The sub-power-source control portion includes an activation signal output portion and a first power state notification portion. The activation signal output portion outputs the activation signal to the plurality of second sub power source portions. The first power state notification portion outputs a first alarm signal to cause the display-related equipment to output an alarm, when a detection result of the power state detection portion satisfies a predetermined unfavorable condition. The activation signal output portion outputs the activation signal to the display-related second sub power source portion with higher priority when the detection result of the power state detection portion satisfies the unfavorable condition, than when the detection result does not satisfy the unfavorable condition.

An image processing apparatus according to another aspect of the present disclosure includes: the display-related equipment that includes a display portion and a display control portion, the display portion displaying information, the display control portion controlling the display portion; and the power source device according to the aspect of the present disclosure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the attached drawings. It should be noted that the following description is examples of specific embodiments of the present disclosure and should not limit the technical scope of the present disclosure.

[First Embodiment]

Figure 1:
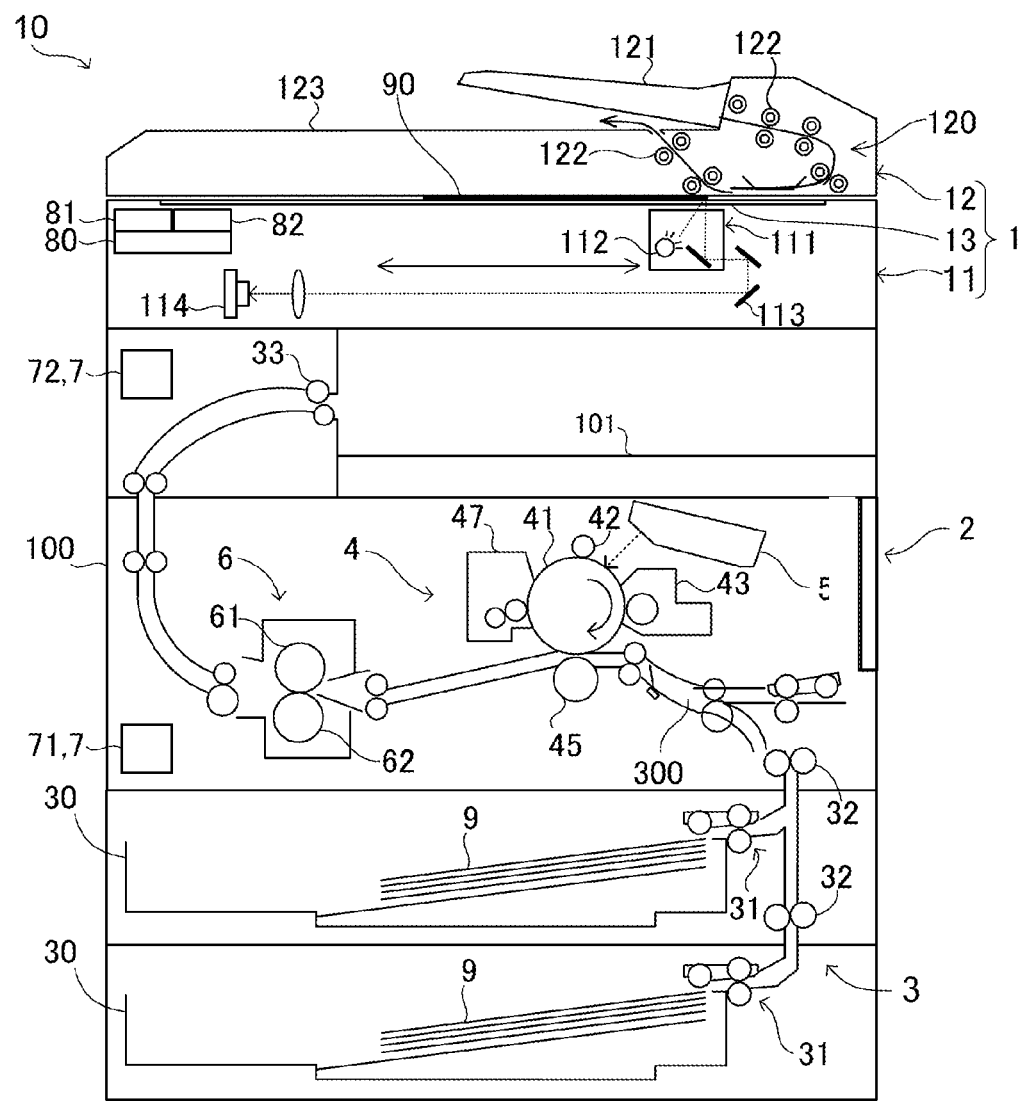
FIG. 1 is a configuration diagram of an image processing apparatus according to the first embodiment of the present disclosure.
Figure 2:
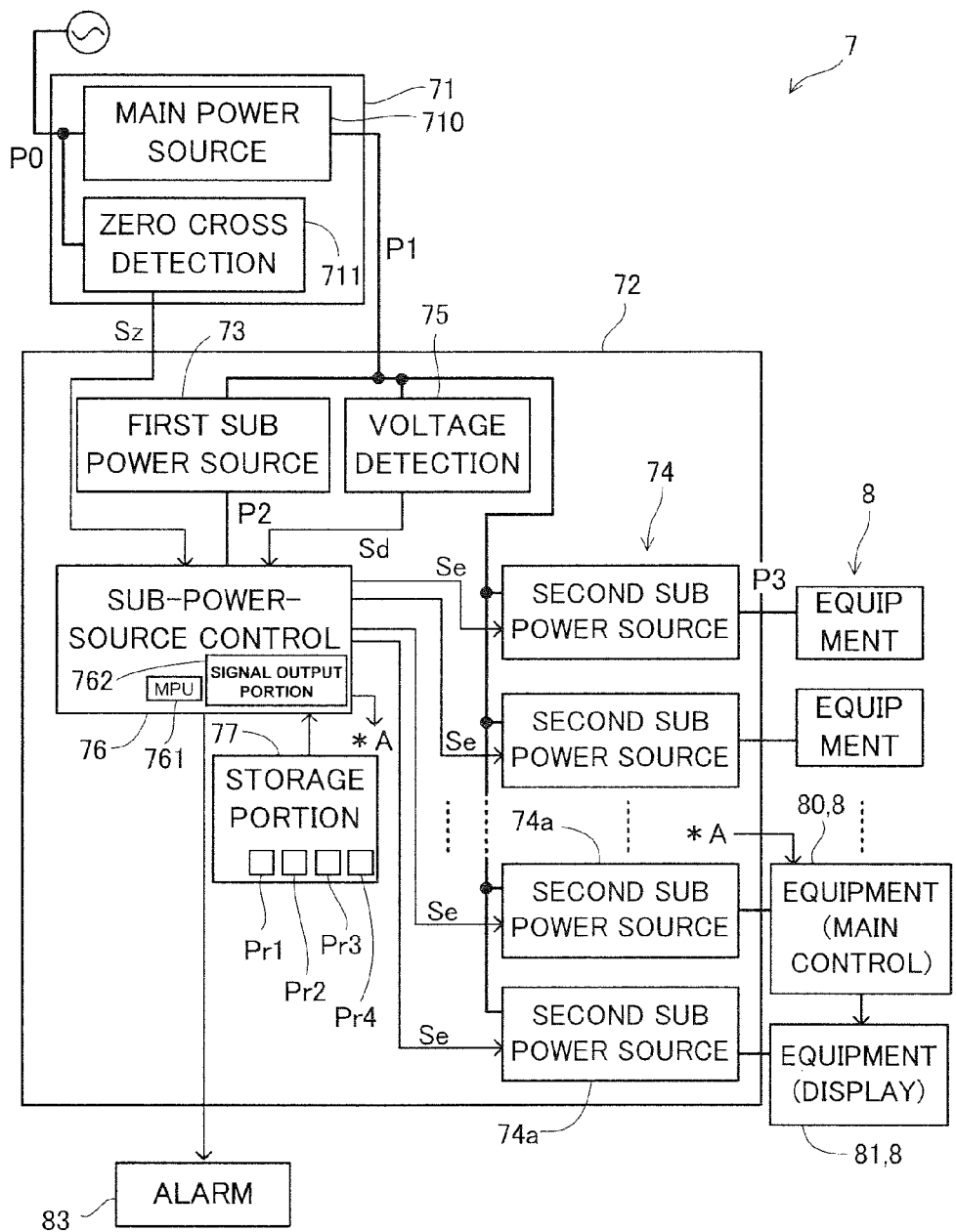
FIG. 2 is a block diagram of a power source device provided in the image processing apparatus according to the first embodiment of the present disclosure.

First, a description is given of an image processing apparatus 10 according to the first embodiment of the present disclosure with reference to FIGS. 1 and 2. As shown in FIG. 1, the image processing apparatus 10 includes an image forming device 2 that includes a power source device 7. Furthermore, the image processing apparatus 10 according to the present embodiment further includes an image reading device 1, a main control portion 80, a display portion 81, and an operation portion 82.

The image processing apparatus 10 is, for example, a copier, a printer or a facsimile having the function of the copier, or a multifunction peripheral. The multifunction peripheral has a plurality of image processing functions including an image reading function.

As shown in FIG. 1, the image reading device 1 includes a transparent document sheet table 13, an image scanning portion 11, and a document sheet table cover 12. An ADF (Auto Document Feeder) 120 is incorporated in the document sheet table cover 12.

The document sheet table 13 is a portion on which a document sheet 90 as an image reading target is placed. The document sheet table cover 12 is supported so as to be pivoted between a closing position and an opening position with respect to a housing 100 of the image processing apparatus 10. When the document sheet table cover 12 is at the closing position, it covers the document sheet table 13, and when the document sheet table cover 12 is at the opening position, the top of the document sheet table 13 is opened.

The image scanning portion 11 includes a moving unit 111, an optical system 113, and an image sensor 114, wherein the moving unit 111 includes a light emitting portion 112, and the optical system 113 includes a mirror and a lens.

The light emitting portion 112 is a light source that emits light toward the document sheet 90 placed on the document sheet table 13. The light emitting portion 112 emits light through the document sheet table 13 to the document sheet 90.

The optical system 113 includes a mirror, a lens and the like for guiding light reflected on the document sheet 90 to a light receiving portion of the image sensor 114. The image sensor 114 is a sensor for detecting, for each pixel, the amount of light reflected on the document sheet 90. The image sensor 114 outputs, as image data, data of the amount of light detected for each pixel. The image sensor 114 may be, for example, a CCD (Charge Coupled Device).

The moving unit 111 moves along a sub scanning direction while supporting the light emitting portion 112 and a part of the optical system 113. With the movement of the moving unit 111, the light-emitting position of the light emitting portion 112 in the sub scanning direction changes, and the position of the area where the reflected light is detected by the image sensor 114 changes as well.

The moving unit 111 moves along the sub scanning direction. This allows the image scanning portion 11 to scan the document sheet 90 along the sub scanning direction while detecting, for each pixel, the amount of reflection light that comes from a linear area extending along a main scanning direction of the document sheet 90.

It is noted that a contact image sensor (CIS) which is integrally composed of the light emitting portion 112, the image sensor 114, and lenses may be adopted as the image scanning portion 11. In this case, the contact image sensor is supported by the moving unit 111.

The ADF 120 conveys, with use of a plurality of rotatable conveyance rollers 122, the document sheet 90 set on a document sheet tray 121 to a document sheet discharge tray 123 via an image reading position. In this process, the image scanning portion 11 reads the image of the document sheet 90 while the moving unit 111 stops at the image reading position.

The image forming device 2 is a device for forming an image on a recording sheet 9 in correspondence with image data sequences output from the image reading device 1. It is noted that the recording sheet 9 is a sheet-like image formation medium such as a sheet of paper, a sheet of coated paper, a postcard, an envelope, or an OHP sheet.

The image forming device 2 includes, for example, a sheet conveying portion 3, an image forming portion 4, an optical scanning portion 5, and a fixing portion 6. The image forming device 2 shown in FIG. 1 is an image forming device of the electrophotographic method. It is noted that the image forming device 2 may be an image forming device of another method such as the inkjet method.

In the sheet conveying portion 3, a sheet feed roller 31 feeds the recording sheet 9 from a sheet storing portion 30 to a sheet conveyance path 300. A sheet conveyance roller 32 then conveys the recording sheet 9 along the sheet conveyance path 300. Furthermore, a discharge roller 33 discharges the recording sheet 9 with an image formed thereon from an outlet of the sheet conveyance path 300 onto a recording sheet discharge tray 101.

The image forming portion 4 forms an image on a surface of the recording sheet 9 while it is moving in the sheet conveyance path 300. The image forming portion 4 includes a drum-like photoconductor 41, a charging portion 42, a developing portion 43, a transfer portion 45, and a cleaning portion 47. The photoconductor 41 is an example of the image carrier.

The photoconductor 41 rotates, and the charging portion 42 charges the surface of the photoconductor 41 uniformly. The optical scanning portion 5 scans the charged surface of the photoconductor 41 with laser light so as to write an electrostatic latent image on the charged surface of the photoconductor 41. Furthermore, the developing portion 43 supplies developer to the photoconductor 41. This enables the electrostatic latent image to be developed as a developer image. It is noted that the developer is supplied to the developing portion 43 from a developer supply portion (not shown).

The transfer portion 45 transfers the developer image from the surface of the photoconductor 41 to the recording sheet 9 that is moving in the sheet conveyance path 300. Finally, the cleaning portion 47 removes residual developer from the surface of the photoconductor 41.

The fixing portion 6 nips the recording sheet 9 with the image formed thereon between a fixing roller 61 and a pressure roller 62 and feeds the sheet to a downstream step, wherein a heater such as a halogen heater is embedded in the fixing roller 61. In this operation, the fixing portion 6 heats the developer image on the recording sheet 9 and fixes the image to the recording sheet 9.

The display portion 81 is a display device such as a liquid crystal panel on which text information can be displayed. The display portion 81 is controlled by the main control portion 80. The operation portion 82 is a device for receiving an information input operation of the user, and is, for example, a touch panel formed on a surface of the panel, or operation buttons.

The main control portion 80 displays the text information on the display portion 81, wherein the text information includes an operation menu and a message notifying the state of the apparatus. The main control portion 80 controls various electric equipment provided in the image processing apparatus 10 based on detection results of various sensors (not shown) and input information that is input via the operation portion 82. The main control portion 80 is an example of the display control portion that controls the display portion 81 that displays information.

In the following description, the main control portion 80 and the display portion 81 are referred to as display-related equipment 80-81, wherein the display portion 81 displays information and the main control portion 80 controls the display portion 81.

The power source device 7 is a device that inputs an AC power from an AC power source such as a commercial power source and generates a DC power from the AC power. The DC power generated by the power source device 7 is supplied to the various electric equipment provided in the image processing apparatus 10.

As shown in FIGS. 1 and 2, the power source device 7 of the present embodiment is divided into an AC power source portion 71 and a DC power source portion 72. As shown in FIG. 2, the AC power source portion 71 includes a main power source portion 710 and a zero cross detection portion 711. The DC power source portion 72 includes a first sub power source portion 73, a plurality of second sub power source portions 74, a voltage detection portion 75, a sub-power-source control portion 76, and a storage portion 77.

The main power source portion 710 includes an AC-DC power source circuit that generates a primary DC power P1 from an input AC power P0 and outputs the primary DC power P1. The AC power P0 is input to the main power source portion 710 from an external AC power source such as a commercial power source. The main power source portion 710 is a constant-voltage power source that has a function to adjust the voltage of the primary DC power P1 to a constant level.

The zero cross detection portion 711 includes a circuit configured to detect a time point when the voltage of the AC power P0 that is input to the main power source portion 710 passes through a zero cross point. The zero cross point is a point at which the voltage of the AC power P0 becomes 0 volt.

The zero cross detection portion 711 outputs a zero cross signal Sz to the sub-power-source control portion 76 each time the voltage of the AC power P0 passes through the zero cross point, wherein the zero cross signal Sz is a pulse signal. The zero cross detection portion 711 is an example of the power state detection portion that detects the state of the frequency of the power input to the main power source portion 710.

The first sub power source portion 73 includes a DC-DC power source circuit that generates a secondary DC power from the primary DC power P1 and outputs the secondary DC power. The secondary DC power output from the first sub power source portion 73 is referred to as a power source control secondary DC power P2. The first sub power source portion 73 is, for example, a constant-voltage power source that has a function to adjust the voltage of the power source control secondary DC power P2 to a constant level.

Each of the plurality of second sub power source portions 74 includes a DC-DC power source circuit that generates a secondary DC power from the primary DC power P1 and outputs the secondary DC power. Each of the plurality of second sub power source portions 74 is activated upon receiving an activation signal Se output from the sub-power-source control portion 76. This enables each of the plurality of second sub power source portions 74 to generate a secondary DC power from the primary DC power P1 and output the secondary DC power. The secondary DC power output from the plurality of second sub power source portions 74 is referred to as an equipment secondary DC power P3.

The equipment secondary DC power P3 is a power supplied to equipment 8 other than the sub-power-source control portion 76. Each second sub power source portion 74 is, for example, a constant-voltage power source that has a function to adjust the voltage of the equipment secondary DC power P3 to a constant level. In addition, the activation signal Se is an enable signal that is used to switch the plurality of second sub power source portions 74 from an idle state to an operation state for generating the equipment secondary DC power P3 so as to enable the output of the equipment secondary DC power P3.

Each of the plurality of second sub power source portions 74 outputs the equipment secondary DC power P3 having a voltage and a capacity that are fitted to the equipment 8 connected to that second sub power source portion 74. As a result, the voltages of the equipment secondary DC powers P3 output from the plurality of second sub power source portions 74 are not necessarily the same.

The equipment 8 to which power is supplied from the plurality of second sub power source portions 74 includes the display-related equipment 80-81. When a second sub power source portion 74 that supplies the equipment secondary DC power P3 to the display-related equipment 80-81 is activated, it becomes possible for the main control portion 80 to notify the state of the image processing apparatus 10 via the display portion 81. In the following description, among the plurality of second sub power source portions 74, the second sub power source portion 74 that supplies power to the display-related equipment 80-81 is referred to as a display-related second sub power source portion 74a.

The voltage detection portion 75 is a circuit that detects the voltage of the primary DC power P1 output from the main power source portion 710, and outputs a detected voltage signal Sd. The voltage detection portion 75 is an example of the power state detection portion that detects the state of the voltage level of the power output from the main power source portion 710. It is noted that the voltage detection portion 75 is an example of the output voltage detection portion.

The voltage detection portion 75 is, for example, a voltage convergion circuit that converts the voltage of the primary DC power P1 to a voltage of a level that can be input to the sub-power-source control portion 76, and outputs a voltage signal after the convergion to the sub-power-source control portion 76 as the detected voltage signal Sd.

The sub-power-source control portion 76 starts to operate upon receiving the power source control secondary DC power P2 supplied thereto. The sub-power-source control portion 76 is a controller that executes a power source activation control for activating the plurality of second sub power source portions 74. In the power source activation control, the sub-power-source control portion 76 outputs an activation signal to each of the plurality of second sub power source portions 74. The sub-power-source control portion 76 includes, for example, an MPU (Micro Processor Unit) 761 and a signal output portion 762.

The MPU 761 is a processor that performs the power source activation control by executing programs Pr1-Pr4 that are stored in the storage portion 77 in advance. The MPU 761 outputs the activation signal Se to each of the plurality of second sub power source portions 74 via the signal output portion 762. It is noted that the MPU 761 includes a RAM that is a volatile memory for temporarily storing the programs Pr1-Pr4 in execution.

The storage portion 77 is a nonvolatile memory for storing the programs Pr1-Pr4 that cause the MPU 761 to execute the steps of the power source activation control. The storage portion 77 may be, for example, a ROM (Read Only Memory) or a flash memory.

The image processing apparatus 10 also includes an alarm portion 83 that outputs an alarm upon receiving a second alarm signal from the sub-power-source control portion 76, wherein the second alarm signal is described below. The screw member 83 outputs an alarm so as to notify that the power of the main power source portion 710 is not in a favorable condition. The alarm portion 83 receives a power supply directly from the first sub power source portion 73, or via the sub-power-source control portion 76. The alarm portion 83 is, for example, an alarm buzzer or a lamp that brinks when the second alarm signal is input.

Meanwhile, when the image processing apparatus 10 cannot be activated because the input AC power P0 is not in a favorable condition, the user may erroneously assume that the image processing apparatus 10 itself is abnormal. In the image processing apparatus 10, it is preferable to avoid as much as possible a situation that may cause such an erroneous assumption of the user.

With the configuration where the sub-power-source control portion 76 of the power source device 7 executes the power source activation control as follows, it is possible to avoid as much as possible a situation that may cause the erroneous assumption of the user even if the input AC power P0 is not in a favorable condition.

[Power Source Activation Control by Sub-Power-Source Control Portion 76]

Figure 3:
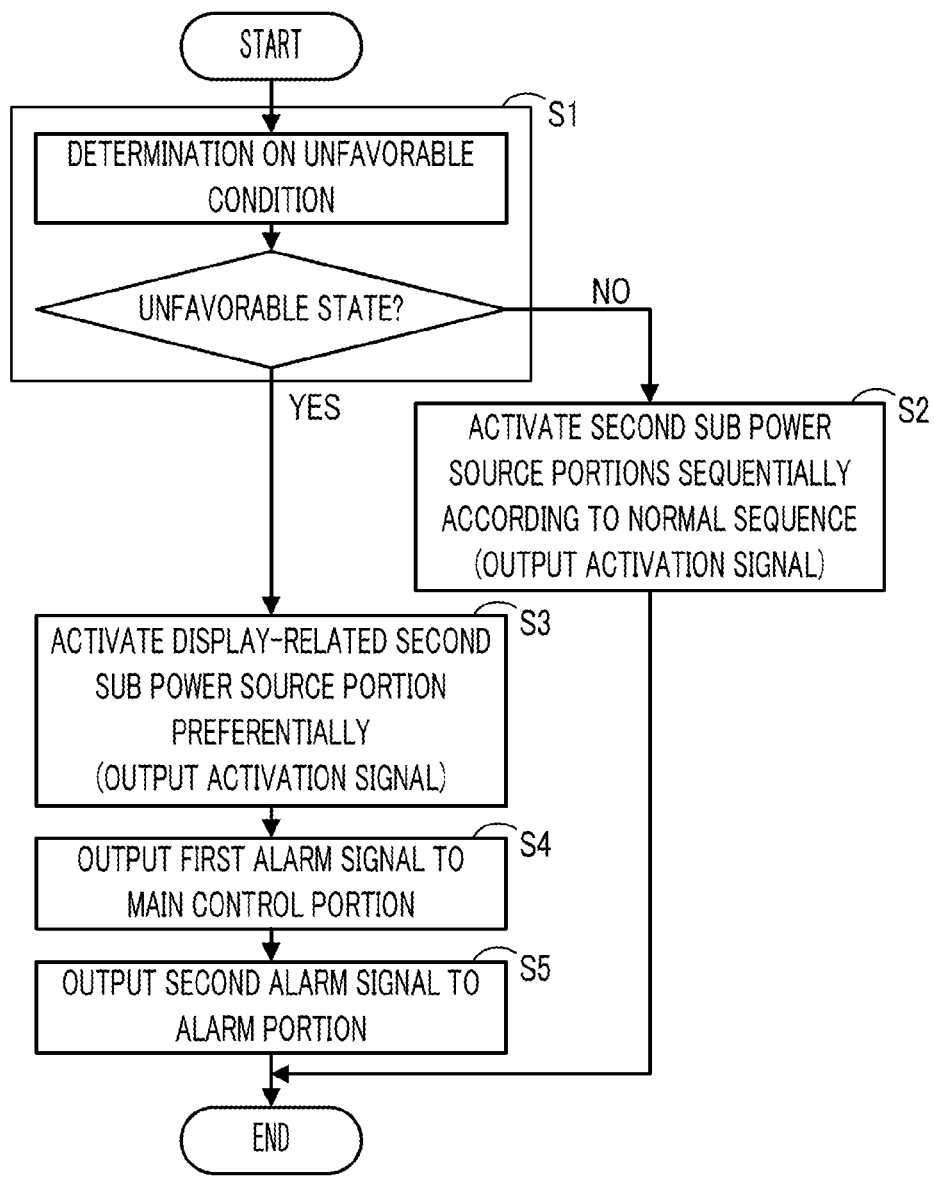
FIG. 3 is a flowchart showing an example of the procedure of a power source activation control executed by a sub-power-source control portion of the power source device provided in the image processing apparatus according to the first embodiment of the present disclosure.

Next, the power source activation control that is executed by the sub-power-source control portion 76 to activate the plurality of second sub power source portions 74 is described with reference to the flowchart shown in FIG. 3. The power source activation control is executed when the sub-power-source control portion 76 is activated. The sub-power-source control portion 76 is activated upon receiving a power supply from the first sub power source portion 73 after power is started to be supplied from the main power source portion 710 to the first sub power source portion 73.

In the following description, S1, S2, . . . represent identification signs of the steps constituting the power source activation control. It is noted that the processes of the sub-power-source control portion 76 described in the following are realized when the MPU 761 executes the control programs stored in the storage portion 77.

<Step S1>

First, the sub-power-source control portion 76 determines whether or not the power of the main power source portion 710 is in an unfavorable state by determining whether or not detection results of the state of the power of the main power source portion 710 satisfy a predetermined unfavorable condition. The detection results of the state of the power of the main power source portion 710 are results of the detection by the zero cross detection portion 711 and the voltage detection portion 75.

The following first condition may be adopted as the unfavorable condition: the frequency with which the voltage of the AC power P0 crosses the zero cross point is outside a predetermined allowable range. For the determination of whether or not the first condition is satisfied, the sub-power-source control portion 76 counts the number of occurrences of the zero cross signal Sz within a predetermined monitoring time after the start of the operation. The sub-power-source control portion 76 determines that the power of the main power source portion 710 is in the unfavorable state if the counted number is outside a predetermined range ranging from an allowable lower limit number to an allowable upper limit number; and otherwise, the sub-power-source control portion 76 determines that the power of the main power source portion 710 is in a favorable state.

Alternatively, the determination with regard to the first condition may be made based on: a plurality of monitoring times; and a plurality of allowable lower limit numbers and a plurality of allowable upper limit numbers respectively corresponding to the plurality of monitoring times. In that case, the sub-power-source control portion 76 determines that the power of the main power source portion 710 is in the unfavorable state if the number of occurrences of the zero cross signal Sz within a predetermined, relatively short, first monitoring time after the activation, is outside a first allowable range.

Furthermore, the sub-power-source control portion 76 also determines that the power of the main power source portion 710 is in the unfavorable state if the number of occurrences of the zero cross signal Sz within a second monitoring time is outside a second allowable range. The second monitoring time is longer than the first monitoring time. The second allowable range includes a larger number of occurrences than the first allowable range. For example, the first monitoring time may be approximately two times to five times the original cycle of the AC power P0. Furthermore, the first monitoring time may be approximately seven times to ten times the original cycle of the AC power P0.

The following second condition may be adopted as the unfavorable condition: the detected voltage signal Sd output from the voltage detection portion 75 does not reach a predetermined allowable range of voltage level within a predetermined monitoring time after the start of the operation of the sub-power-source control portion 76. It is noted that, as described above, the detected voltage signal Sd represents the voltage of the primary DC power P1.

The following third condition may be adopted as the unfavorable condition: the variation of the detected voltage signal Sd output from the voltage detection portion 75 exceeds a predetermined allowable range. In this case, a ripple voltage may be adopted as a determination parameter for the third condition, wherein the ripple voltage represents the size of the ripple superimposed on the DC component of the detected voltage signal Sd. The ripple voltage is an amplitude of the detected voltage signal Sd in a relatively short time period.

The sub-power-source control portion 76 makes the determination based on at least one of the first condition, the second condition and the third condition as the unfavorable condition. It is noted that when the unfavorable condition includes at least one of the first condition, the second condition and the third condition, it means that the unfavorable condition is satisfied if at least one of the first condition, the second condition and the third condition is satisfied.

The step S1 is realized when the MPU 761 of the sub-power-source control portion 76 executes a power source determination program Pr1. That is, the MPU 761 executing the power source determination program Pr1 functions as the power state determination portion that determines whether or not the power of the main power source portion 710 is in the unfavorable state by determining whether or not detection results of the state of the power of the main power source portion 710 satisfy the predetermined unfavorable condition.

<Step S2>

Upon determining, based on the detection results, that the power of the main power source portion 710 is not in the unfavorable state, the sub-power-source control portion 76 activates the plurality of second sub power source portions 74 sequentially according to a predetermined normal sequence. That is, the sub-power-source control portion 76 outputs the activation signal Se to the plurality of second sub power source portions 74 sequentially in the normal order and at the normal time interval. The normal sequence is a sequence for activating the image processing apparatus 10 quickly when the power of the main power source portion 710 is in the favorable state.

Upon determining, based on the detection results, that the power of the main power source portion 710 is not in the unfavorable state, namely, the power of the main power source portion 710 is in the favorable state, the sub-power-source control portion 76 ends the power source activation control after the step S2.

<Step S3>

On the other hand, upon determining, based on the detection results, that the power of the main power source portion 710 is in the unfavorable state, the sub-power-source control portion 76 activates the display-related second sub power source portion 74a. In this case, the sub-power-source control portion 76 activates the display-related second sub power source portion 74a with higher priority compared to some other second sub power source portions 74 than in the case where it activates the display-related second sub power source portion 74a according to the normal sequence.

That is, in step S3, the sub-power-source control portion 76 outputs the activation signal Se to the display-related second sub power source portion 74a with higher priority among the plurality of second sub power source portions 74 than in the case of the normal sequence.

For example, when outputting the activation signal Se to the plurality of second sub power source portions 74 sequentially, the sub-power-source control portion 76 outputs the activation signal Se to the display-related second sub power source portion 74a earlier in the order than in the order of the normal sequence. This allows the display-related second sub power source portion 74a to be activated preferentially earlier than some other second sub power source portions 74. It is noted that the output process of the activation signal Se may be stopped immediately after the activation signal Se is output to the display-related second sub power source portion 74a.

In addition, the control steps may be executed according to the normal sequence until the activation signal Se is output to the display-related second sub power source portion 74a, and then the output process of the activation signal Se may be stopped. This allows the display-related second sub power source portion 74a to be activated preferentially earlier than some other second sub power source portions 74 that are scheduled to be activated after the stop.

Meanwhile, the plurality of second sub power source portions 74 or the equipment 8 which are respectively connected to the plurality of second sub power source portion 74 may have an activation characteristic that it temporarily consumes a large power during the activation due to a reason that it includes a capacitor, or another reason. When the plurality of second sub power source portions 74 and the equipment 8 having such an activation characteristic are sequentially activated at short time intervals under the circumstance that the power of the main power source portion 710 is in the unfavorable state, a temporary power shortage may occur. This may result in a situation where the plurality of second sub power source portions 74 and the equipment 8 cannot be activated normally.

On the other hand, the temporary power shortage may be avoided by activating the plurality of second sub power source portions 74 and the equipment 8 sequentially at relatively long time intervals even if the power of the main power source portion 710 is in the unfavorable state. In that case, the plurality of second sub power source portions 74 and the equipment 8 can be activated normally.

In view of the above, it may be set that the sub-power-source control portion 76 outputs the activation signal Se to each of the plurality of second sub power source portions 74 at longer time intervals than in the normal sequence when the power of the main power source portion 710 is in the unfavorable state. This may allow the temporary power shortage to be avoided and allow the plurality of second sub power source portions 74 and the equipment 8 to be activated normally.

The steps S2 and S3 are realized when the MPU 761 of the sub-power-source control portion 76 executes an activation signal output program Pr2. That is, the MPU 761 executing the activation signal output program Pr2 functions as the activation signal output portion. When it is determined, based on the detection results, that the power of the main power source portion 710 is in the unfavorable state, the activation signal output portion outputs the activation signal Se to the display-related second sub power source portion 74a with higher priority among the plurality of second sub power source portions 74 than when it is determined that the power of the main power source portion 710 is not in the unfavorable state.

<Step S4>

After the step S3, the sub-power-source control portion 76 outputs a first alarm signal to cause the display-related equipment 80-81 to output an alarm. More specifically, the sub-power-source control portion 76 outputs the first alarm signal to the main control portion 80. Upon receiving the signal, the main control portion 80 outputs a message via the display portion 81, wherein the message indicates that the power of the main power source portion 710 is not in the favorable state.

In addition, it may be determined, based on the detection results, that the power of the main power source portion 710 is in the unfavorable state in case the plug of the power source cord of the image processing apparatus 10 is not correctly connected to the insertion port of the power source of the AC power P0. In view of this, it may be set that, upon receiving the first alarm signal, the main control portion 80 outputs a countermeasure message via the display portion 81, wherein the countermeasure message includes a suggestion to confirm the connection state of the plug of the power source cord.

The step S4 is realized when the MPU 761 of the sub-power-source control portion 76 executes a first power state notification program Pr3. That is, the MPU 761 executing the first power state notification program Pr3 functions as the first power state notification portion. The first power state notification portion outputs the first alarm signal to cause the display-related equipment 80-81 to output an alarm when it is determined, based on the detection results, that the power of the main power source portion 710 is in the unfavorable state.

<Step S5>

Furthermore, upon determining that the power of the main power source portion 710 is in the unfavorable state, the sub-power-source control portion 76 outputs a second alarm signal to the alarm portion 83. This allows the alarm portion 83 to output an alarm upon input of the second alarm signal. This alarm notifies that the power of the main power source portion 710 is not in the favorable state.

After outputting the first alarm signal and the second alarm signal, the sub-power-source control portion 76 ends the process regarding the power source activation control.

The step S5 is realized when the MPU 761 of the sub-power-source control portion 76 executes a second power state notification program Pr4. That is, the MPU 761 executing the second power state notification program Pr4 functions as the second power state notification portion. The second power state notification portion outputs the second alarm signal to the alarm portion 83 when it is determined, based on the detection results, that the power of the main power source portion 710 is in the unfavorable state.

As described above, in the power source device 7, the sub-power-source control portion 76 activates the display-related second sub power source portion 74a with higher priority among the plurality of second sub power source portions 74 when it determines that the power of the main power source portion 710 is in the unfavorable state, than when it determines that the power of the main power source portion 710 is not in the unfavorable state (S3). Furthermore, the sub-power-source control portion 76 causes the display-related equipment 80-81, which receive a power supply from the display-related second sub power source portion 74a, to output an alarm.

Accordingly, with the adoption of the power source device 7, even when only a part of the equipment 8 can be activated normally due to the reason that the input AC power P0 is not in the favorable condition, the user can recognize the cause of the activation failure by the alarm output by the display-related equipment 80-81. As a result, it is possible to avoid a situation where the user erroneously recognizes that the image processing apparatus 10 itself is abnormal.

Furthermore, the display-related equipment 80-81 may be configured to output a countermeasure message upon receiving the first alarm signal from the sub-power-source control portion 76, wherein the countermeasure message includes a suggestion to confirm the connection state of the plug of the power source cord. This increases the possibility that the image processing apparatus 10 can be activated normally.

In addition, when the power source device 7 has a function to output an alarm via the alarm portion 83, the user can recognize the cause of the activation failure by the alarm output by the alarm portion 83 when even the display-related equipment 80-81 that are activated preferentially, are not activated normally. As a result, it is possible to avoid, in a more reliable manner, a situation where the user erroneously recognizes that the image processing apparatus 10 itself is abnormal.

[Second Embodiment]

Figure 4:
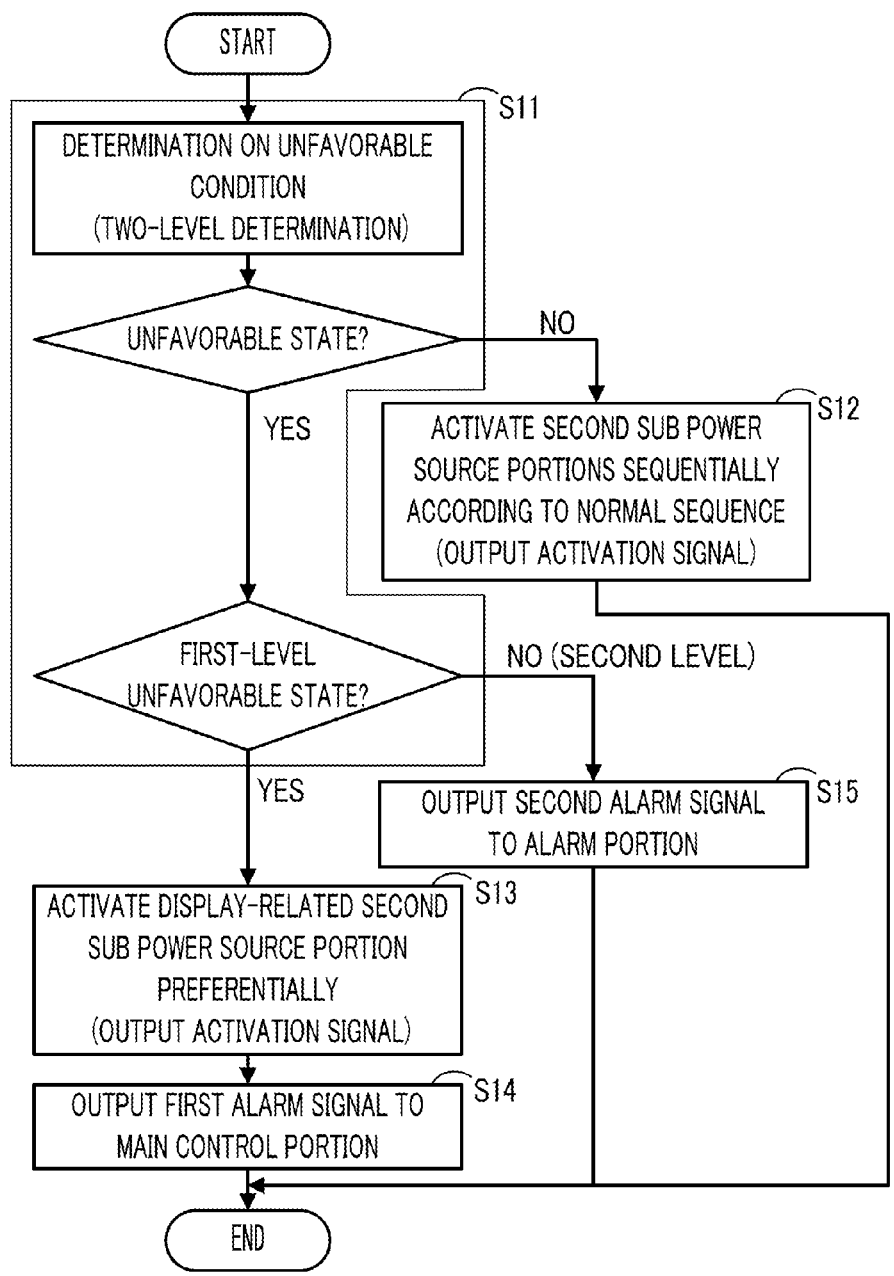
FIG. 4 is a flowchart showing an example of the procedure of the power source activation control executed by the sub-power-source control portion of the power source device provided in the image processing apparatus according to the second embodiment of the present disclosure.

Next, a description is given of the power source activation control executed by the sub-power-source control portion 76 of the power source device 7 in the image processing apparatus according to the second embodiment of the present disclosure, with reference to FIG. 4. FIG. 4 is a flowchart showing an example of the procedures of the power source activation control executed by the sub-power-source control portion 76 in the second embodiment.

The image processing apparatus according to the second embodiment has an equivalent configuration as the image processing apparatus 10 of the first embodiment. The image processing apparatus according to the second embodiment differs from the image processing apparatus 10 in part of the power source activation control executed by the sub-power-source control portion 76. The following describes an example of the power source activation control executed by the sub-power-source control portion 76 of the second embodiment.

In the following description, S11, S12, . . . represent identification signs of the steps constituting the power source activation control. It is noted that the processes of the sub-power-source control portion 76 described in the following are realized when the MPU 761 executes the control programs stored in the storage portion 77.

<Step S11>

First, the sub-power-source control portion 76, as in the step S1, determines whether or not the power of the main power source portion 710 is in the unfavorable state by determining whether or not detection results of the state of the power of the main power source portion 710 satisfy the predetermined unfavorable condition. However, in the step S11, the sub-power-source control portion 76 determines whether or not detection results of the state of the power of the main power source portion 710 satisfy the predetermined unfavorable condition that is divided into two levels.

When a second-level unfavorable condition is satisfied, it indicates that the power of the main power source portion 710 is in a more unfavorable state than when a first-level unfavorable condition is satisfied. More specifically, the first-level unfavorable condition is of a level where even if the condition is satisfied, the display-related second sub power source portion 74a and the display-related equipment 80-81 can be activated. On the other hand, the second-level unfavorable condition is of a level where when the condition is satisfied, the display-related second sub power source portion 74a and the display-related equipment 80-81 cannot be activated.

For example, when the first condition is adopted as the unfavorable condition, with regard to the allowable range of the frequency with which the voltage of the AC power P0 crosses the zero cross point, the allowable range for the second level is set to be more outside the frequency in the favorable state than the allowable range for the first level.

In addition, when the second condition is adopted as the unfavorable condition, with regard to the allowable range of the detected voltage signal Sd, the second-level allowable range is set to be more outside the level of the detected voltage signal Sd in the favorable state than the first-level allowable range.

Furthermore, when the third condition is adopted as the unfavorable condition, with regard to the allowable range of the variation of the detected voltage signal Sd, the second-level allowable range is set to be more wider than the first-level allowable range.

The step S11 is realized when the MPU 761 of the sub-power-source control portion 76 executes the power source determination program Pr1.

<Step S12>

Upon determining, based on the detection results, that the power of the main power source portion 710 is not in the unfavorable state, the sub-power-source control portion 76, as in the step S2, activates the plurality of second sub power source portions 74 sequentially according to the normal sequence.

<Step S13>

On the other hand, upon determining, based on the detection results, that the power of the main power source portion 710 is in the unfavorable state of the first level, the sub-power-source control portion 76, as in the step S3, activates the display-related second sub power source portion 74a. The sub-power-source control portion 76 activates the display-related second sub power source portion 74a with higher priority compared to some second sub power source portions 74 than in the case where it activates the display-related second sub power source portion 74a according to the normal sequence.

That is, in step S13, the sub-power-source control portion 76 outputs the activation signal Se to the display-related second sub power source portion 74a with higher priority among the plurality of second sub power source portions 74 than in the case of the normal sequence.

The steps S12 and S13 are realized when the MPU 761 of the sub-power-source control portion 76 executes the activation signal output program Pr2.

<Step S14>

After the step S13, the sub-power-source control portion 76 outputs the first alarm signal to cause the display-related equipment 80-81 to output an alarm. More specifically, the sub-power-source control portion 76 outputs the first alarm signal to the main control portion 80. Upon receiving the signal, the main control portion 80 outputs a message via the display portion 81, wherein the message indicates that the power of the main power source portion 710 is not in the favorable state.

The step S14 is realized when the MPU 761 of the sub-power-source control portion 76 executes the first power state notification program Pr3.

<Step S15>

On the other hand, upon determining that the power of the main power source portion 710 is in the unfavorable state of the second level, the sub-power-source control portion 76, as in the step S5, outputs the second alarm signal to the alarm portion 83. This allows the alarm portion 83 to output an alarm upon input of the second alarm signal.

After outputting the first alarm signal or the second alarm signal, the sub-power-source control portion 76 ends the process regarding the power source activation control.

The step S15 is realized when the MPU 761 of the sub-power-source control portion 76 executes the second power state notification program Pr4.

As described above, in the second embodiment, the sub-power-source control portion 76 determines whether or not the two-level unfavorable condition is satisfied. Furthermore, the sub-power-source control portion 76 outputs the first alarm signal when the first-level unfavorable condition is satisfied, and outputs the second alarm signal when the second-level unfavorable condition is satisfied.

The state where the first-level unfavorable condition is satisfied is a state of a level where a relatively minor power source failure has occurred, and the display-related second sub power source portion 74a and the display-related equipment 80-81 can be activated. In that case, if an alarm including information such as the state of the power source or the countermeasure is output via the display portion 81, it is possible to avoid an erroneous recognition of the user and suggest to take a proper action.

In addition, the state where the second-level unfavorable condition is satisfied is a state of a level where a relatively serious power source failure has occurred and the display-related equipment 80-81 cannot be activated. In that case, according to the second embodiment, an alarm is output in a different form depending on whether the power source failure is minor or serious. This makes it possible for the user to easily recognize the seriousness of the situation.

[Application Examples]

In the above-described power source device 7, the zero cross detection portion 711 may count the number of occurrences of the zero cross signal Sz within a predetermined monitoring time, and output the information of the counted number to the sub-power-source control portion 76. In that case, the sub-power-source control portion 76 determines whether or not the unfavorable condition is satisfied by determining whether or not the counted number of occurrences of the zero cross signal Sz is outside a predetermined allowable range.

In addition, the voltage detection portion 75 may detect whether or not the detected voltage signal Sd has reached a predetermined allowable range of voltage level within a predetermined time, and output the detection result to the sub-power-source control portion 76. In that case, the sub-power-source control portion 76 determines whether or not the unfavorable condition is satisfied by determining whether or not a detection result indicating that the detected voltage signal Sd has reached the allowable range is input from the voltage detection portion 75 within a predetermined time after the start of the operation.

Furthermore, the voltage detection portion 75 may detect the ripple voltage of the detected voltage signal Sd within a predetermined time, and output the information of the ripple voltage to the sub-power-source control portion 76. In that case, the sub-power-source control portion 76 determines whether or not the unfavorable condition is satisfied by determining whether or not the ripple voltage is within a predetermined allowable range.

Furthermore, the power source device 7 may be applied to an information processing apparatus or other apparatuses other than the image processing apparatus.

It is noted that the power source device and the image processing apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A power source device comprising:
a main power source portion configured to generate a primary DC power from an input AC power and output the primary DC power;
a first sub power source portion configured to generate, from the primary DC power, a power source control secondary DC power and output the power source control secondary DC power;
a plurality of second sub power source portions which are each configured to, upon input of an activation signal, generate an equipment secondary DC power from the primary DC power and output the equipment secondary DC power;
a power state detection portion configured to detect a state of a power of the main power source portion; and
a sub-power-source control portion configured to start to operate upon receiving the power source control secondary DC power, wherein
the plurality of second sub power source portions include a display-related second sub power source portion configured to supply power to display-related equipment that displays information,
the sub-power-source control portion includes:
an activation signal output portion configured to output the activation signal to the plurality of second sub power source portions; and
a first power state notification portion configured to output a first alarm signal to cause the display-related equipment to output an alarm, when a detection result of the power state detection portion satisfies a predetermined unfavorable condition, and
the activation signal output portion outputs the activation signal to the display-related second sub power source portion with higher priority when the detection result of the power state detection portion satisfies the predetermined unfavorable condition, than when the detection result does not satisfy the predetermined unfavorable condition.

2. The power source device according to claim 1, wherein the sub-power-source control portion further includes:
a second power state notification portion configured to output a second alarm signal to an alarm portion when the detection result of the power state detection portion satisfies the predetermined unfavorable condition, and
the alarm portion receives a power supply from the first sub power source portion and outputs an alarm upon input of the second alarm signal.

3. The power source device according to claim 2, wherein the first power state notification portion outputs the first alarm signal when the detection result of the power state detection portion satisfies a first-level unfavorable condition, and the second power state notification portion outputs the second alarm signal when the detection result of the power state detection portion satisfies a second-level unfavorable condition.

4. The power source device according to claim 1, wherein the power state detection portion includes a zero cross detection portion configured to detect a time point when a voltage of the AC power that is input to the main power source portion passes through a zero cross point, and the predetermined unfavorable condition is that a frequency with which the voltage of the AC power crosses the zero cross point is outside a predetermined allowable range.

5. The power source device according to claim 1, wherein the power state detection portion includes an output voltage detection portion configured to detect a voltage of the primary DC power output from the main power source portion, the predetermined unfavorable condition includes at least one of two conditions, one of the two conditions is that the voltage detected by the output voltage detection portion does not reach a predetermined allowable range within a predetermined time period after a start of operation of the sub-power-source control portion, and the other of the two conditions is that a variation of the voltage detected by the output voltage detection portion exceeds the predetermined allowable range.

6. An image processing apparatus comprising:

the display-related equipment that includes a display portion and a display control portion, the display portion displaying information, the display control portion controlling the display portion; and the power source device according to claim 1.

\* \* \* \* \*